US008528454B2

(12) United States Patent
Serra Obiol

(10) Patent No.: US 8,528,454 B2
(45) Date of Patent: Sep. 10, 2013

(54) COUNTER-DIE CYLINDER FOR A STAMPING MACHINE

(75) Inventor: Ramon Serra Obiol, Barcelona (ES)

(73) Assignee: Comercial Industrial Maquinaria Carton Ondulado, S.L., Barcelona (ES)

( * ) Notice: Subject to any disclaimer, the term of this patent is extended or adjusted under 35 U.S.C. 154(b) by 176 days.

(21) Appl. No.: 13/262,649

(22) PCT Filed: Feb. 9, 2010

(86) PCT No.: PCT/ES2010/070071
§ 371 (c)(1), (2), (4) Date: Nov. 15, 2011

(87) PCT Pub. No.: WO2010/112642
PCT Pub. Date: Oct. 7, 2010

(65) Prior Publication Data

US 2012/0048091 A1 Mar. 1, 2012

(30) Foreign Application Priority Data

Apr. 3, 2009 (ES) .................................. 200900921

(51) Int. Cl.
*B23D 25/12* (2006.01)

(52) U.S. Cl.
USPC ............................................... 83/331; 83/659

(58) Field of Classification Search
USPC .................. 83/311, 310, 658, 659, 879, 355, 83/356
See application file for complete search history.

(56) References Cited

U.S. PATENT DOCUMENTS

| | | | | |
|---|---|---|---|---|
| 3,916,744 | A * | 11/1975 | West | 83/175 |
| 4,063,493 | A | 12/1977 | Mcevers | |
| 4,240,312 | A * | 12/1980 | Ward, Sr. | 83/311 |
| 4,736,660 | A | 4/1988 | Benach | |
| 6,913,566 | B2 * | 7/2005 | Polikov et al. | 493/60 |
| 6,991,696 | B2 * | 1/2006 | Wagner et al. | 156/250 |
| 7,214,175 | B2 * | 5/2007 | Janzen | 493/476 |

FOREIGN PATENT DOCUMENTS

| | | |
|---|---|---|
| WO | 2009113900 | 9/2009 |

* cited by examiner

*Primary Examiner* — Sean Michalski
(74) *Attorney, Agent, or Firm* — Sturm & Fix LLP

(57) ABSTRACT

Counter-die cylinder (1) for a machine for stamping laminar material, which comprises a cylindrical body (2) that rotates on its own axis, at least one tubular element (3), delimiting two opposite ends, which is arranged on the cylindrical body (2), and at least one shroud (4) arranged around the corresponding said tubular element (3), which further comprises movement means linked to the two opposite ends of the at least one tubular element for moving said tubular element in a longitudinal direction with respect to the axis of the cylindrical body, such that the position of the tubular element can vary along the length of the cylindrical body (2), said movement means being actuated by automated actuation means. In this way, the wear on the shrouds is reduced simply and automatically.

14 Claims, 4 Drawing Sheets

FIG.2
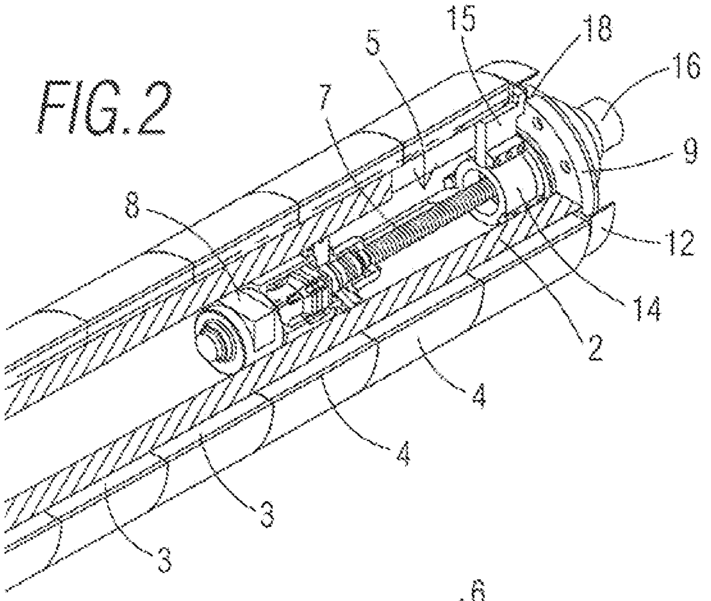
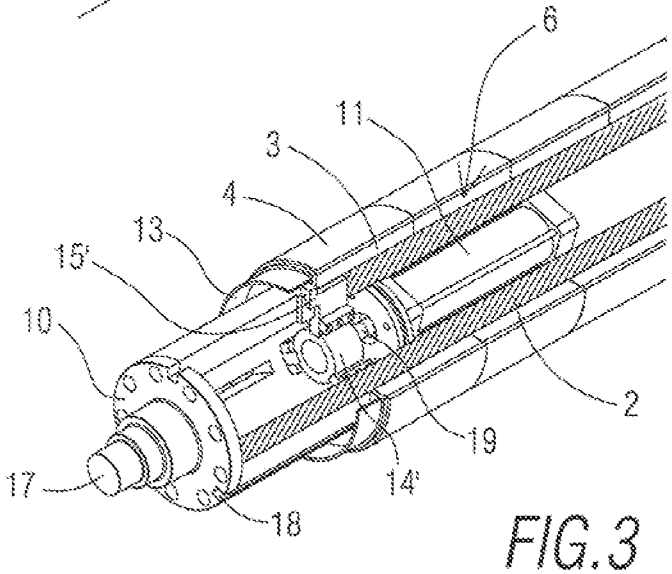
FIG.3

COUNTER-DIE CYLINDER FOR A STAMPING MACHINE

OBJECT OF THE INVENTION

The purpose of the Invention patent herein is to register a counter-die cylinder for a stamping machine that incorporates significant innovations and advantages.

More specifically, the invention relates to a counter-die cylinder applicable in particular to a rotary stamping machine for stamping laminar material that comprises a cylindrical body that rotates on its own axis, at least one tubular element arranged around the cylindrical body and one shroud arranged around the corresponding said tubular element, allowing axial movement of the tubular element.

BACKGROUND OF THE INVENTION

It is well-known that a type of rotary stamping machine, for example that used in the manufacture of boxes from corrugated cardboard sheets based on passing a sheet of corrugated cardboard between two cylinders, is provided with a die-holder cylinder where the die and a counter-die cylinder are mounted and provided with shrouds that are usually made of plastic laminar material, such as polyurethane, where the blades for cutting the corrugated cardboard are sunken.

The shrouds usually become unevenly worn over time by repeated penetration of the die-blades, resulting in areas with a significantly smaller diameter and, therefore, areas of lesser penetration or lesser pressure of the blades, a fact that may cause problems during stamping operations so much that it can prevent cutting and/or cause problems related to splitting.

A first known solution to prevent this uneven wearing involves rectifying the surface of the blades regularly. However, this solution requires downtime in production and/or in turn causes accelerated wear of said shrouds.

Another solution known by the holder to reduce this drawback involves applying a slow axial movement (and of small range) of the counter-die cylinder such that the worn area of said counter-die cylinder is more evenly distributed and not centred on one particular area. Said solution fails to completely solve this problem because it produces grooves the size of the movement of the counter-die cylinder whose range is limited due to problems of space between beds (limited to approximately 50 mm).

Finally, shroud rotary systems spreading wear evenly across all shrouds are known and widely used in combination with the aforementioned solutions. The problem with rotation is the difficulty, hazards and time required to remove and secure the shrouds and to move the remaining shrouds.

DESCRIPTION OF THE INVENTION

The invention herein has been developed with the aim of providing a counter-die cylinder that resolves the aforementioned drawbacks, further providing other additional advantages that will be apparent from the description detailed hereinafter.

It is therefore an object of the invention to provide a counter-die cylinder for a machine for stamping laminar material of the type that comprises a cylindrical body that rotates on its own axis, at least one tubular element delimiting two opposite ends (for example, on the lateral edge itself or by means of buffer rings located at each end) that is arranged around the cylindrical body and at least one shroud arranged around said tubular element and is characterized in that it comprises movement means linked to the buffer rings for moving in a longitudinal direction with respect to the axis of the cylindrical body of the aforementioned tubular element, such that the position of the tubular element can vary along the length of the cylindrical body, said movement means being actuated by automated actuation means.

Thanks to these characteristics, the shrouds can move axially automatically without having the disadvantages mentioned above, i.e. the service life of the shrouds is extended without the need for honing the shrouds since wearing occurs uniformly and in turn movement of the structure described to move said shrouds is automated.

Preferred embodiments of the object of the invention are described in dependent claims.

In a preferred embodiment, the movement means and automated actuation means are located inside the cylindrical body. In doing so, no additional space is required to arrange the movement mechanism for the shrouds by making use of the space inside the cylindrical body which is usually hollow and empty inside, and consequently there is no interference with other equipment or components in the machine.

Preferably the movement means comprise at least one pushing element associated with the automated actuation means.

Advantageously, the counter-die cylinder comprises a counter-pressure element that exerts a force opposite to the force exerted by the pushing element.

In a particularly preferred embodiment of the counter-die cylinder, the pushing element comprises a pusher member located on an axially movable axis that passes through the inside the cylindrical body provided with an engine that can be a geared motor, the pusher member being in direct contact with a buffer ring arranged at one end of the tubular element.

Also preferably, the counter-pressure element comprises a pneumatic cylinder housed securely inside the cylindrical body that includes a pusher member that is in direct contact with a second buffer ring arranged at the end opposite to the previously mentioned end.

According to another aspect of the invention, the pusher member that is part of the pusher element and the counter-pressure element comprises an annular body provided with at least one retention tab that protrudes outwards and movable along a raglet located in the cylindrical body, the annular body being integrally secured to a spindle connected to the motor and to the pneumatic cylinder, respectively.

In an alternative embodiment of the invention, the movement means and automated actuation means may be located on the outside of the cylindrical body.

Additionally, the cylindrical body of the counter-die cylinder is provided with at least one access door to access the inside a simple and practical manner, such that in the case of maintenance or repair or replacement of any of the components that may be located on the inside, complete disassembly of the counter-die cylinder is not required.

According to another characteristic of the invention, the counter-die cylinder comprises synchronization means, such that the linear speed of the movement means is synchronized with the rotational speed of the rotating cylindrical body. Such means are associated with a control unit in the machine which is arranged in the counter-die cylinder.

Other characteristics and advantages of the counter-die cylinder object of the invention herein will become apparent from the description of a preferred, although not exclusive embodiment, which is illustrated by way of non-limiting example in the drawings appended, in which:

BRIEF DESCRIPTION OF THE DRAWINGS

FIG. 2.—Enlarged detail view in a partially sectioned perspective of a section of the counter-die cylinder where the automated actuation means are located;

FIG. 3.—Enlarged detail view increased in perspective of a section of the partially sectioned counter-die cylinder where the counter-pressure element is located;

DESCRIPTION OF A PREFERRED EMBODIMENT

Figure 1:
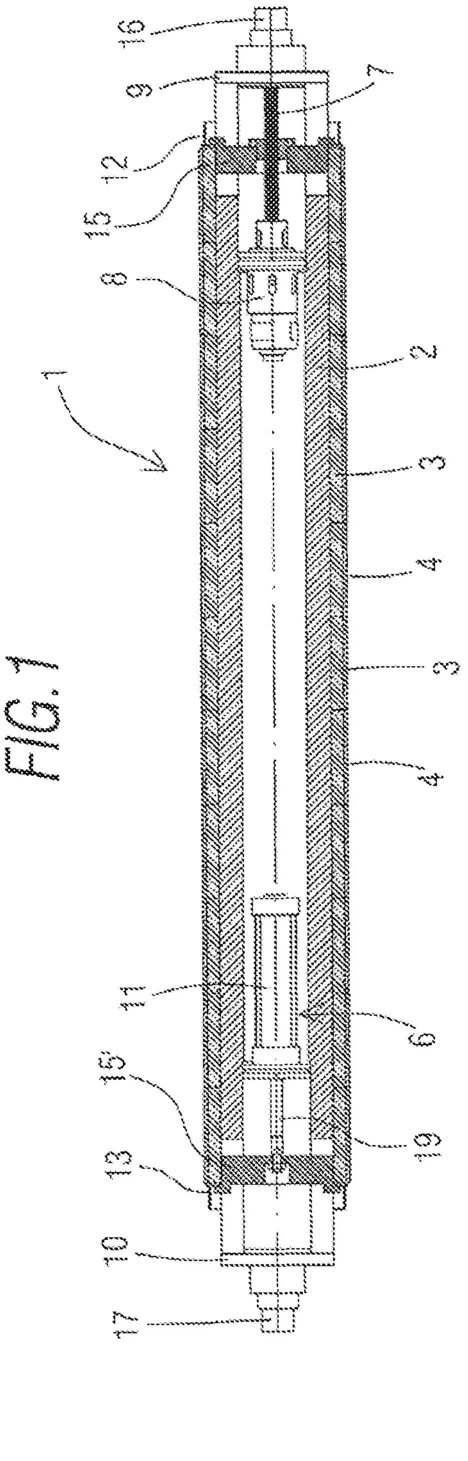
FIG. 1.—Elevation view of a longitudinally cut counter-die cylinder according to the invention herein.

As shown in the attached figures, an embodiment of a counter-die cylinder for a stamping machine for laminar material (not shown), indicated generally by reference 1, particularly suitable for stamping corrugated cardboard boxes, comprises an elongated cylindrical body (2) that rotates on its own axis and is horizontally coupled to the frame or bed of the stamping machine by means of two circular metal (9,10) plates at each end, which are each provided with axis-centred support and rotation (16, 17) respectively through which the rotational movement of the counter-die cylinder (1) is transmitted in a known way so it is not necessary to go into greater detail.

In addition, as is usual in this type of stamping machine a plurality of aligned tubular elements (3), arranged on the outer surface of the cylindrical body (2) and a plurality of shrouds (4) are provided, for example, polyurethane, each of which is arranged around its corresponding tubular element (3).

Additionally, the counter-die cylinder (1) is provided with movement means, which will be detailed hereinbelow, that allow movement, in a longitudinal direction, of the tubular elements (3) along with shrouds (4) with respect to the axis of the cylindrical body (2), such that the position of the tubular element (3) can vary along the length of the cylindrical body (2) by a relatively slow swinging movement of the shroud, i.e., from one end of the machine bed to the other on which the counter-die cylinder (1) is arranged, with said movement means actuated by automated actuation means which can be actuated by means of a button located on a part of the stamping machine or connected to the actual functioning of the counter-die cylinder (1).

As can be seen more clearly in FIGS. 2 and 3, such movement means comprise a pusher element (5) associated with automated actuation means and a counter-pressure element (6) capable of being moved that exerts a force opposite to the force exerted by the pusher element (5).

Making particular reference to the pusher element (5), this comprises a pusher member located on an axially movable axis (7) that passes through the inner cavity of the cylindrical body (2) that is provided with a reduced size geared motor (8), with dual rotation direction while the pusher member is in direct contact with a buffer ring (12) arranged at one end of the tubular element (3).

On the other hand, in respect of the counter-pressure element (6) (see FIG. 3) it comprises a pneumatic cylinder (11), connected to a supply of compressed air that may be associated with other parts of the stamping machine, whose pneumatic cylinder (11) is housed inside the cylindrical body (2) and is integrally secured on the inside thereof. Said counter-pressure element (6) includes a pusher member movable by means of the cylinder (11) piston (19), which is in contact with a second buffer ring (13) arranged at the end opposite to the previously mentioned end. While the counter-die cylinder (1) is operating, this pneumatic cylinder (11) exerts a constant pressure on the buffer ring (13) that can be adjusted if so required.

As a result, the axis (7) always works against the force exerted by the pneumatic cylinder (11) and is responsible for transmitting the final movement of the shrouds. The changing rotating direction of the axis (7) can be carried out using detector elements or limit switches located on both the outside and inside of the counter-die cylinder (1).

It will be apparent to a person skilled in the art that instead of using a pneumatic cylinder, a hydraulic cylinder or any other equivalent system could be used.

The two aforementioned pusher members each comprise an annular body (14), 14' respectively, provided with retention tabs (15, 15') that protrude radially outwards and movable along raglets (18) located in the cylindrical body (2) in a radial arrangement, with the number of raglets (18) equal to the number of retention tabs provided. As can be seen, such retention tabs (15, 15') consist of metal plates that have a protuberance on the upper part that acts as a buffer with a flange on the buffer ring.

Figure 4:
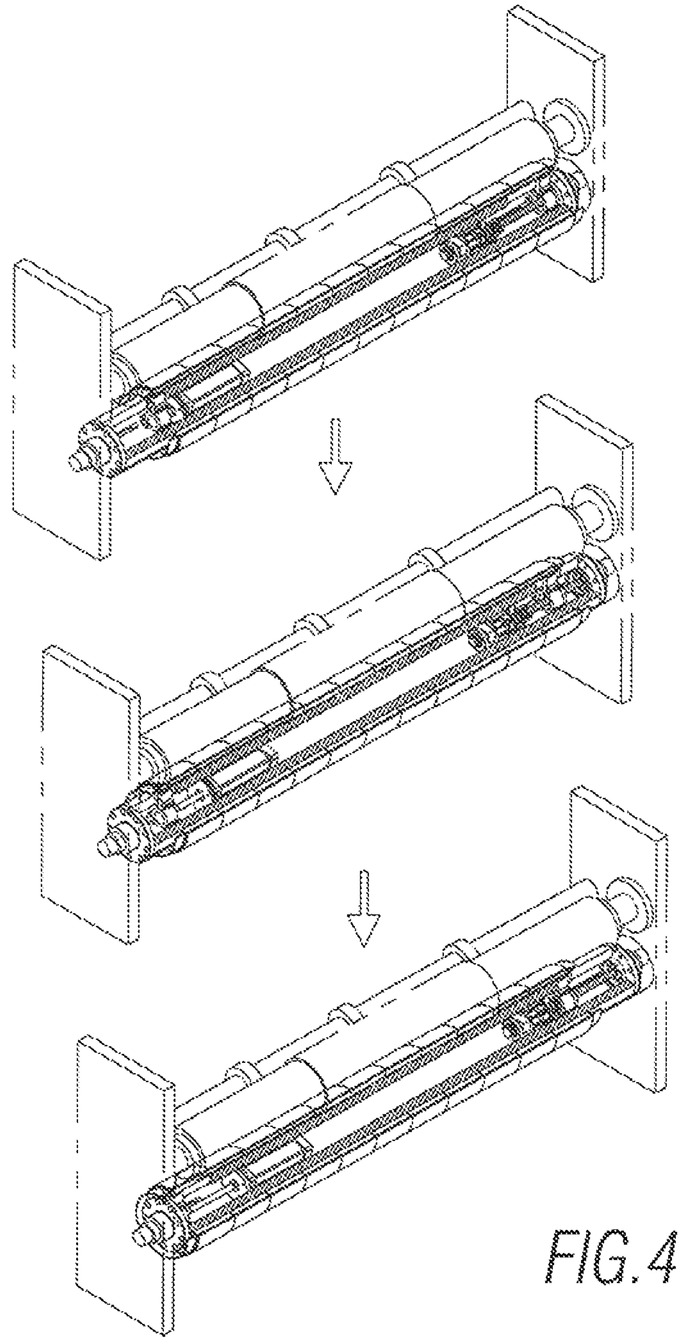
FIG. 4.—Three perspective views of the counter-die cylinder of the invention in three different positions.

FIG. 4 shows a sequence of three stages where the movement of the shrouds (4) to the left of the image can be seen, such that the buffer rings (12 and 13) move together with the shrouds (4) by means of the retention tabs (15, 15'). Additionally, this figure shows the arrangement of the die-holder cylinder above the counter-die cylinder (1) described in the memory herein.

Figure 5:
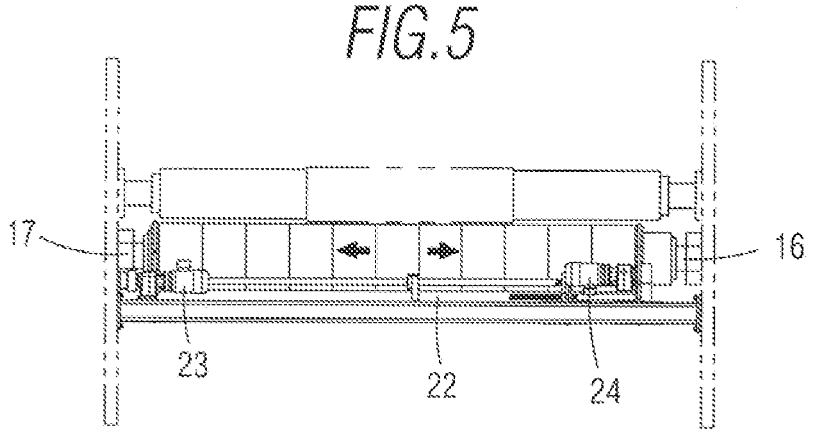
FIG. 5.—Front elevation view of a second embodiment of the counter-die cylinder of the invention.
Figure 6:
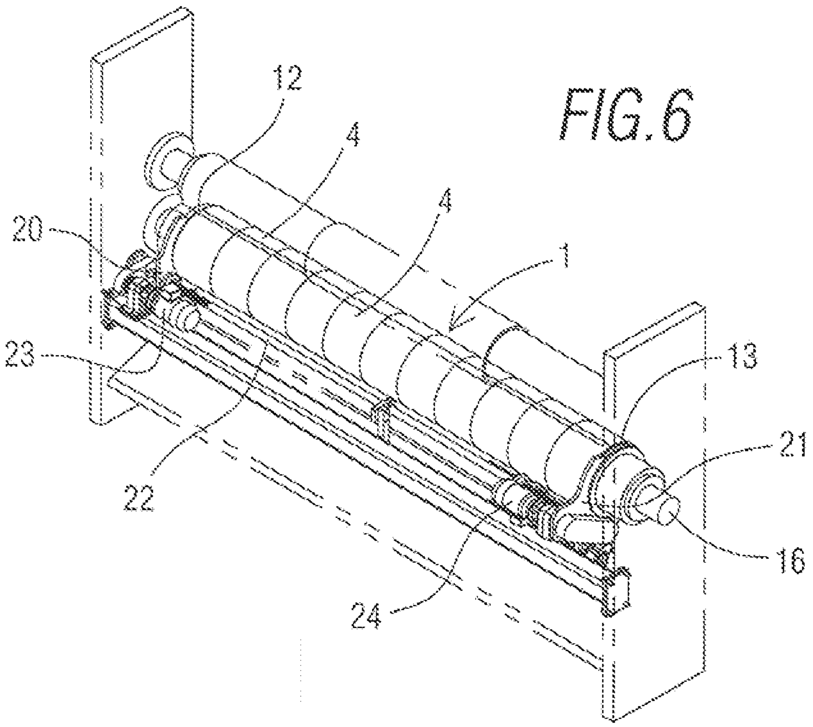
FIG. 6.—Perspective view of the embodiment shown in FIG. 5.

In a second embodiment of the invention shown in FIGS. 5 and 6, the movement means and motorized actuation means may be located outside the cylindrical body, which have used the same reference numerals for the common elements with the previously described embodiment.

In this case the movement means of the counter-die cylinder comprise a pair of pins (20), (21) each associated to respective buffer rings (12), (13) located at the two opposite ends of the counter-die cylinder (1), performing the swinging movement of such pins (20), (21) in a similar manner to the pusher members described previously along a spindle (22) which runs in parallel and separately to the counter-die cylinder, as indicated by arrows in FIG. 5. As can be seen, each of the pins is provided with a geared actuation system (23), (24) respectively which is integral to the corresponding pin (20), (21).

Additionally, the buffer rings (12), (13) may have an additional incorporated mechanism that rotates with the tubular elements on which the shrouds are, preventing wear as a result of friction during movement.

It will be apparent to a person skilled in the art that the cylindrical body/bodies and shroud(s) can form a single integral body axially moveable without thereby departing from the scope of protection defined by the characteristics in claim 1.

The details, shapes, dimensions and other accessory elements as well as the materials used in the manufacture of the counter-die cylinder of the invention may be conveniently replaced by others that are technically equivalent and do not depart from the essential nature of the invention or from the scope defined by the claims appended hereinafter.

The invention claimed is:

1. Counter-die cylinder (I) for a machine for stamping laminar material, comprising a cylindrical body that rotates on its own axis, at least one tubular element, delimiting two opposite ends, which is arranged on the cylindrical body, and at least one shroud arranged around the corresponding said tubular element, wherein movement means linked to the two opposite ends of at least one tubular element for moving said tubular element in a longitudinal direction with respect to the axis of the aforementioned cylindrical body, such that the position of the tubular element can vary along the length of the cylindrical body, with said movement means being actuated by automated actuation means.

2. A counter-die cylinder according to claim 1, wherein the movement means and automated actuation means are located inside the cylindrical body.

3. A counter-die cylinder according to claim 1, wherein the movement means and automated actuation means are located on the outside of the cylindrical body.

4. Counter-die cylinder according to claim 2, wherein the movement means comprise at least one pusher element associated with the automated actuation means.

5. Counter-die cylinder according to claim 4, wherein a counter-pressure element which exerts a force opposite to the force exerted by the pusher element.

6. Counter-die cylinder according to claim 2, wherein the pusher element comprises a pusher member located on an axially movable axis that passes through the inside of the cylindrical body provided with a dual rotation direction motor, while the pusher member is in direct contact with one of the buffer rings arranged at one end of the tubular element.

7. Counter-die cylinder according to claim 6, wherein the pusher member comprises an annular body provided with at least one retention tab that protrudes outwards and moveable along a raglet located in the cylindrical body, with the annular body integrally secured to a spindle connected to the motor.

8. Counter-die cylinder according to claim 2, wherein the counter-pressure element comprises a pneumatic cylinder housed securely inside the cylindrical body that includes a moveable pusher member that is in direct contact with the second buffer ring arranged at the end opposite to the abovementioned end.

9. Counter-die cylinder according to claim 8, wherein the pusher member comprises an annular body provided with at least one retention tab that protrudes outwards and moveable along a raglet located in the cylindrical body, with the annular body integrally secured to a movable piston that is part of the pneumatic cylinder.

10. A counter-die cylinder according to claim 1, wherein each end covering the total length defined by at least one tubular element has a buffer ring (12, 13).

11. Counter-die cylinder according to claim 1, wherein a plurality of tubular elements aligned on the rotating cylindrical body on which a corresponding shroud is placed on each tubular element.

12. Counter-die cylinder according to claim 1, wherein the cylindrical body is provided with at least one access door to access the inside of the cylindrical body.

13. Counter-die cylinder according to claim 1, wherein the automated actuation means are adjustable in speed.

14. Counter-die cylinder according to claim 1, wherein synchronization means, such that the linear speed of the movement means is synchronized with the rotational speed of the rotating cylindrical body.

* * * * *